United States Patent
Wang

(10) Patent No.: US 7,070,634 B1
(45) Date of Patent: Jul. 4, 2006

(54) PLASMA REFORMER FOR HYDROGEN PRODUCTION FROM WATER AND FUEL

(76) Inventor: Chi S. Wang, 5923 Fairmont Dr., Woodridge, IL (US) 60517

( * ) Notice: Subject to any disclaimer, the term of this patent is extended or adjusted under 35 U.S.C. 154(b) by 53 days.

(21) Appl. No.: 10/699,857

(22) Filed: Nov. 3, 2003

(51) Int. Cl.
*B01J 7/00* (2006.01)

(52) U.S. Cl. .................. 48/61; 48/65; 48/89; 48/62 R; 48/197 R; 48/127.9; 48/198.6; 422/186.04; 422/168; 422/186; 422/173; 422/174; 422/175; 422/198; 422/199; 422/187; 422/224; 422/240; 422/241

(58) Field of Classification Search .................. 48/61, 48/65, 89, 62 R, 197 R, 127.9, 198.6; 422/186.4, 422/168, 186, 173–175, 198–199, 187, 224, 422/240–241
See application file for complete search history.

(56) References Cited

U.S. PATENT DOCUMENTS

| | | | |
|---|---|---|---|
| 5,614,156 A | | 3/1997 | Wang |
| 5,744,104 A | * | 4/1998 | Sakurai et al. ............. 422/174 |
| 5,746,051 A | * | 5/1998 | Kieser et al. ................ 60/275 |
| 5,746,985 A | | 5/1998 | Takahashi |
| 5,843,395 A | | 12/1998 | Wang |
| 5,929,286 A | | 7/1999 | Krumpelt et al. |
| 5,939,025 A | | 8/1999 | Ahmed et al. |
| 6,097,139 A | * | 8/2000 | Tuck et al. ................. 313/310 |
| 6,197,267 B1 | * | 3/2001 | Naeem ....................... 422/174 |
| 6,221,117 B1 | | 4/2001 | Edlund et al. |
| 6,245,309 B1 | | 6/2001 | Etievant et al. |
| 6,348,278 B1 | | 2/2002 | LaPierre et al. |

OTHER PUBLICATIONS

3M Designer's Guide for Interam Catalytic Converter Mat Products, p. 1-1, May 1997.*
U.S. Department of Energy, Hydrogen Production and Delivery Research, Solicitation No. DE-PS36-03G093007, Jul., 24, 2003, pp. 2, c-7.
Spindt, C.A., A Thin-Film Field-Emission Cathode, J. Of Applied Physics, 39, 1968, pp. 3504-3505.

* cited by examiner

*Primary Examiner*—Glenn Caldarola
*Assistant Examiner*—Vinit H. Patel
(74) *Attorney, Agent, or Firm*—Philip H. Kier

(57) ABSTRACT

A plasma reformer for the chemical reforming of gaseous mixtures of water and hydrocarbon fuels for producing hydrogen. The reformer contains a reaction chamber with outer lateral walls containing emitter electrodes and inner lateral walls containing collector electrodes. The emitter electrodes and collector electrodes form an electric circuit. There are a multiplicity of thin needle-like extrusions on the emitter electrode from which a profusion of high energy electrons are emitted. These high-energy electrons dissociate the hydrocarbon fuel through absorption and ionization emitting low energy electrons in the process. These low energy electrons cause dissociation of water. Thus, dissociation of hydrocarbon fuel acts to initiate dissociation of water. The molar ratio of water to hydrocarbon fuel in the input mixture for reactions, and therefor the production of hydrogen from water, increases with carbon number of the hydrocarbon fuel.

13 Claims, 3 Drawing Sheets

PLASMA REFORMER FOR HYDROGEN PRODUCTION FROM WATER AND FUEL

BACKGROUND OF THE INVENTION

This invention pertains to a plasma reformer for dissociating $H_2O$ and hydrocarbon fuels to produce hydrogen for direct use or for use in a fuel cell and carbon oxides. More particularly it pertains to dissociating $H_2O$ into hydrogen and oxygen in a plasma reformer that uses a hydrocarbon fuel as an initiator and an intense electron field under non-equilibrium thermal plasma conditions to dissociate $H_2O$.

Hydrogen powered fuel cells have long been recognized as having great potential for stationary power generation and for transportation applications. Advantages of fuel cells include their ability to generate power more efficiently than internal combustion engines and other conventional power sources while producing essentially no pollutants. However, currently, no scalable, cost-effective, environmentally attractive hydrogen production process is available for commercialization. Hydrogen can be produced from dissociation of $H_2O$ or from reforming of hydrogen fuels. Dissociation of $H_2O$ is ideal from an environmental perspective because it produces no greenhouse gases; however, dissociation of $H_2O$ through electrolysis is energy-intensive and prohibitively expensive.

Hydrogen can be produced from hydrocarbon fuels with use of conventional technologies such as steam reforming, partial oxidation, and auto-thermal reforming. For example, Takahashi in U.S. Pat. No. 5,746,985 and Edlund, et al in U.S. Pat. No. 6,221,117 teach use of steam reforming reactions; Krumpelts, et al in U.S. Pat. No. 5,942,346 and Ahmed, et al in U.S. Pat. Nos. 5,939,025 teach use of partial oxidation reactions. However, these technologies tend to require large components and to be not efficient in meeting large demands, a disadvantage for space-limited facilities such as fueling stations. There are also several technical issues such as capability for fast starts, fast response to load changes, sulfur contamination, and soot or carbon formation. One problem common to conventional reforming is sulfur removal. Conventional reformer technology requires removal of sulfur from liquid fuels, which is usually accomplished with use of catalysts and heavy heaters. Such components usually raise gas poisoning and temperature sensitivity issues. Also in conventional reformer technology, poor fuel dispersion will create uneven fuel distribution and result in carbon/coke formation in fuel-rich zones and hot spots in fuel-lean zones.

The inventor has developed technology for dissociating compounds in a thermoelectric reactor using ultra-pyrolysis techniques with thermal radiation enhancement, non-equilibrium reactions derived from electromagnetic forces, and energy trapping to achieve and maintain temperatures sufficient to achieve very high conversion rates. When the compound contains hydrogen, such as hydrocarbon fuels and hydrogen sulfide, its dissociation produces hydrogen. The inventor has taught the use of thermoelectric reactors to destroy volatile organic compounds in U.S. Pat. No. 5,614,156, to dissociate hydrogen sulfide into hydrogen and sulfur in U.S. Pat. No. 5,843,395, and to reform hydrocarbon fuels to produce hydrogen in U.S. application Ser. No. 10/121,390 now abandoned.

Such a reactor has recently been tested for reforming several transportation fuels to produce hydrogen. The results are given in Table 1.

TABLE 1

| Fuel | Electricity Consumption[a], % | Fuel Conv. Eff.[b], % | $H_2$ Conv Eff.[c], % | Energy Eff.[d], % | $H_2$ Conc.[e] (dry) % |
|---|---|---|---|---|---|
| Methanol | <3 | ~100 | 93–95 | ~100 | 64 |
| Ethanol | <6 | ~100 | 94 | ~100 | 54 |
| Gasoline | <6 | ~100 | 97 | ~100 | 65 |

Note:
[a]Electricity Consumption = (electrical power input)/(electrical power input + LHV of input fuel)
[b]Fuel Conversion Efficiency = 1 − (fuel in reformate)/(input fuel)
[c]$H_2$ Conversion Efficiency = ($H_2$ measured in reformate)/($H_2$ theoretical value in equilibrium)
[d]Energy Efficiency = (LHV of $H_2$ in reformate)/(LHV of input fuel + electric power input)
[e]Measured $H_2$ concentration in reformate as dry basis. This concentration was measured right after the $H_2$ reformer (without any other gas conditioning).
LHV = Low Heating Value The U.S. Department of Energy (USDOE), (Hydrogen Production and Delivery Research Solicitation No. DE-PS36-03GO93007, Jul. 24, 24, 2003, pares 2. c-7)[1] estimates that currently it costs between $5.00 and $6.00 to produce a kilogram of hydrogen, and that this cost should be reduced to $1.50/kg to be competitive with conventional fuels. The USDOE has also set a primary energy efficiency of 75% to be met in the year 2010. The primary energy efficiency of conventional reformer technology for producing hydrogen currently ranges up to 70%. Thus a three to four-fold decrease in cost is necessary for hydrogen to become a competitively priced fuel. A significant fraction of the cost of hydrogen production is the cost of the hydrocarbon fuels that are reformed. If $H_2O$ were to replace hydrocarbon fuels as the primary source of hydrogen in a reformer, such cost reductions are feasible.

It is difficult to dissociate $H_2O$ with thermal energy because very high temperatures, in excess of 2500° C., are needed. Also, it is difficult to ionize $H_2O$ because it has a higher ionization energy potential and enthalpy formations of ions (12.6 eV and 976 kJ/mol, respectively) than hydrocarbon fuels of interest. For example, gasoline has an ionization energy of 9.8 eV and an enthalpy formation of ions of 737 kJ/mol. In addition, it is difficult to ionize $H_2O$ using high energy ("hard") electrons because $H_2O$ is a small molecule that has a small bombardment target area for ionization by high energy (hard) electrons that are newly emitted from electrodes. However, $H_2O$ much more readily absorbs low energy ("soft") electrons that have lost much of their energy in collisions with other ions and hydrocarbon molecules. Thus hydrogen can be produced in a reformer from dissociation of $H_2O$ through ionization and from dissociation of hydrocarbon fuels through heat and ionization when the temperature in the reaction chamber of reformer is sufficiently high (in excess of 700° C.) and when there is an intense field of low energy electrons. These conditions can be created or found in some plasmas.

SUMMARY OF THE INVENTION

The present invention is a reformer that dissociates a gaseous $H_2O$/hydrocarbon fuel input mixture in a non-equilibrium thermal plasma environment. The heart of the reformer is a reaction chamber. The outer lateral wall of the reactor is an emitter electrode and the inner lateral wall is a collector electrode, the emitter electrode and the collector electrode forming an electric circuit. The emitter electrode contains a multiplicity of thin needle-like extrusions. External electricity causes electrons to be emitted copiously from the needle-like extrusions. Spindt (A Thin-Film Field Emission Cathode, J. Of Applied Physics 39, 1968. pp. 3504–3505)[2] discusses how these could be produced. These high energy electrons are absorbed by hydrocarbon molecules and ionize the hydrocarbon molecules to create a greater number of lower energy electrons than were absorbed. These lower energy electrons in turn interact with $H_2O$ to dissociate it. A non-combustion pyrolysis process is used to create and maintain this environment. Dissociation of $H_2O$ is induced by ionization in the plasma environment. The present invention in part replaces hydrocarbon fuels, which have costs, with $H_2O$, which is virtually without cost, as a fuel for producing hydrogen. Preliminary cost estimates based on $H_2O$ replacing 50% of the hydrocarbon fuel and a nearly 100% primary energy efficiency indicate that a cost of less than $2.00/kg of hydrogen can be achieved. This cost can be further reduced through optimization of the system and operational conditions so that the cost target of $1.50/kg of hydrogen is feasible. Therefore, an object of the invention is to reduce the cost of producing hydrogen to commercially competitive levels while reducing the consumption of hydrocarbon fuels. Other objects that result from reduced use of hydrocarbon fuels are reducing the production of greenhouse gases and if the hydrocarbon fuels are fossil fuels, reducing the use of scarce or imported fuels.

Reforming techniques that use combustion require introduction of air. The introduction of air causes nitrogen dilution, increases product gas volume, causes polluting nitrogen oxides emissions, and causes formation of free oxygen, which compromises hydrogen safety. Therefore, another object of the invention is to eliminate the undesirable consequences of using combustion. The external supplemental energy source for the invention is electricity. This allows for quick starts and quick response to transient load changes, and provides control for maintaining optimum conditions for hydrogen production. Therefore, another object of the invention is to provide a quick-starting/responding and readily controlled reformer for producing hydrogen.

Reforming techniques that use catalysts require large reaction areas. This large-area requirement imposes scalability problems and limits the quantity of hydrogen that can be produced at locations with limited space such as refueling stations in a city. Since this invention does not use catalysts, another object is to provide a scalable and high-power density reformer for hydrogen production. The presence of $H_2O$ results in chemical reactions wherein carbon dioxide rather than carbon or soot is formed. Therefore another object of the invention is to avoid carbon or soot formation.

BRIEF DESCRIPTION OF THE SEVERAL VIEWS

DETAILED DESCRIPTION OF THE INVENTION

Figure 1:
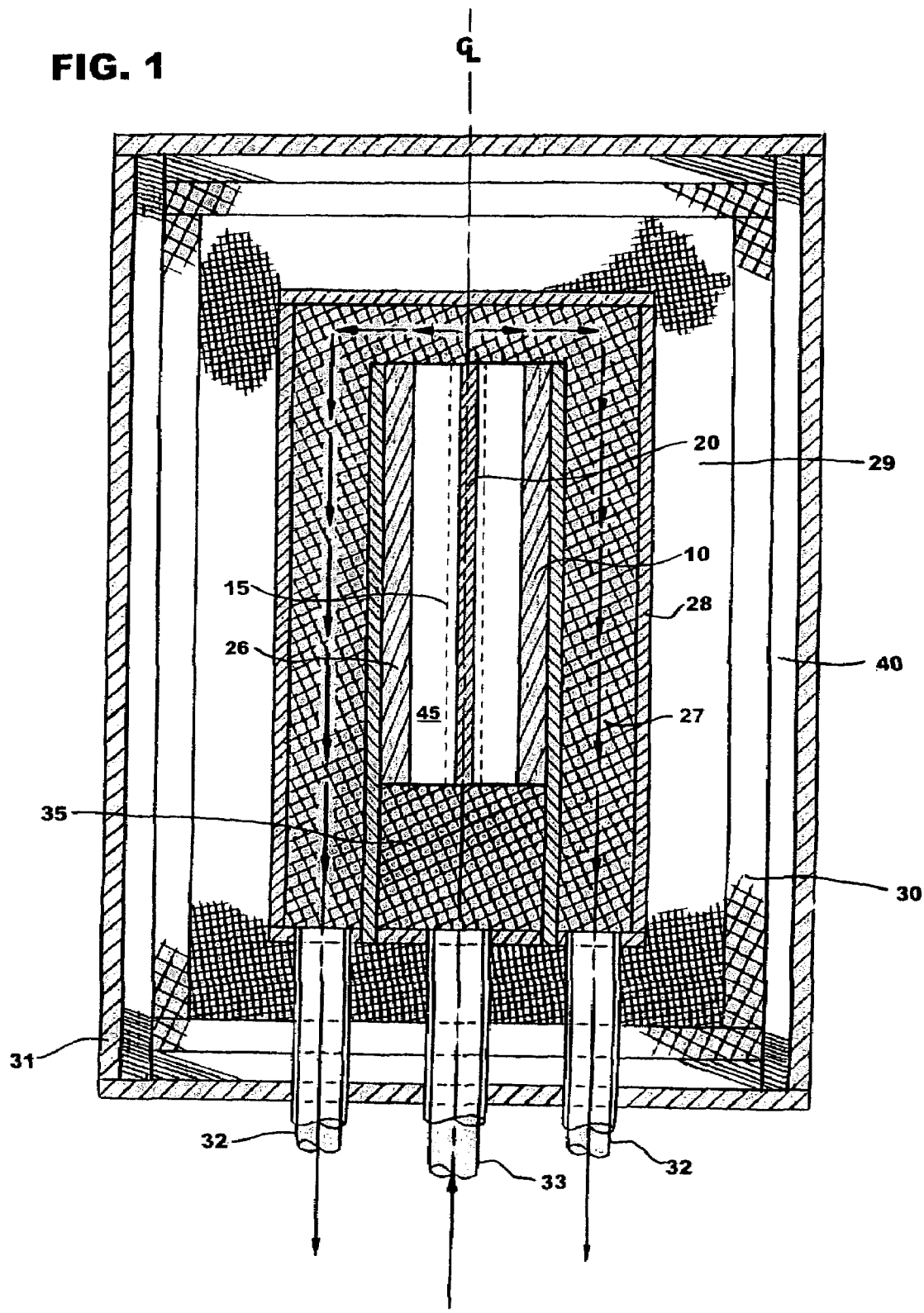
FIG. 1 shows an elevational cross section of the plasma reformer.

With reference to FIG. 1 the plasma reformer, has an inlet 33 to admit a flow of a gaseous mixture of $H_2O$ and hydrocarbon fuel into the plasma reformer. This mixture is preheated to a temperature in the range of 350° C. to 500° C. external to the reformer and then further heated and mixed in turbulent heating zone 35. The mixture then enters reaction chamber 45. The reaction chamber contains one or more emitter electrodes 10 and one or more collector electrodes 20. Each emitter electrode-collector electrode pair forms an electric circuit and is at high temperature being heated by an external supplemental source of electricity. The electrical energy produces active energetic electrons ($_{hard}e^-$), and maintains and controls optimal plasma conditions. These hard electrons produce excited species ions, free radicals, and additional lower energy electrons ($_{soft}e^-$) through electron-impaction or electron-expelling dissociation, excitation, and ionization of hydrocarbon molecules. When multiple electrodes are used there could be in circuits using different external sources of electricity, such as 110 volt AC, 220 volt AC or DC. The emitter electrodes 10 are embedded in the outer lateral walls of the reaction chamber. The collector electrodes 20, which can be single or multiple, form or are embedded in the inner lateral wall of the reaction chamber, which surrounds the center line $C_L$ of the reformer. It is preferred that a filter 15, which could be made of a semiconductor, such as silicon-based zirconium oxide, or a ceramic alloy such as alumina, surrounds the collector electrodes. The filter acts to neutralize ions and to allow passing of electrons to the collector electrode(s) while slowing them down so that they impart less kinetic energy (heat) to the collector electrodes. The filter also acts as a thermal radiation shield to cool the collector electrode(s) to improve their effectiveness. The hot emitter electrodes emit active high-energy electrons ($_{hard}e^-$) that may be absorbed by hydrocarbon molecules in the reaction chamber or may expel orbital electrons from the hydrocarbon molecules if the energy transferred to the molecule exceeds the ionization potential of the molecule. When an orbital electron is expelled, the molecule becomes ionized and the incident or expelled electron loses energy and becomes a lower energy or soft electron ($_{soft}e^-$). The energy-degraded incident electron and the expelled electrons are soft electrons. More than one orbital electron can be expelled as shown in Eq. 1, where M represents a molecule $$M + (_{hard}e^-) \Longrightarrow M^+ + 2(_{soft}e^-) \Longrightarrow M^{++} + 3(_{soft}e^-) \qquad (1)$$

Figure 2:
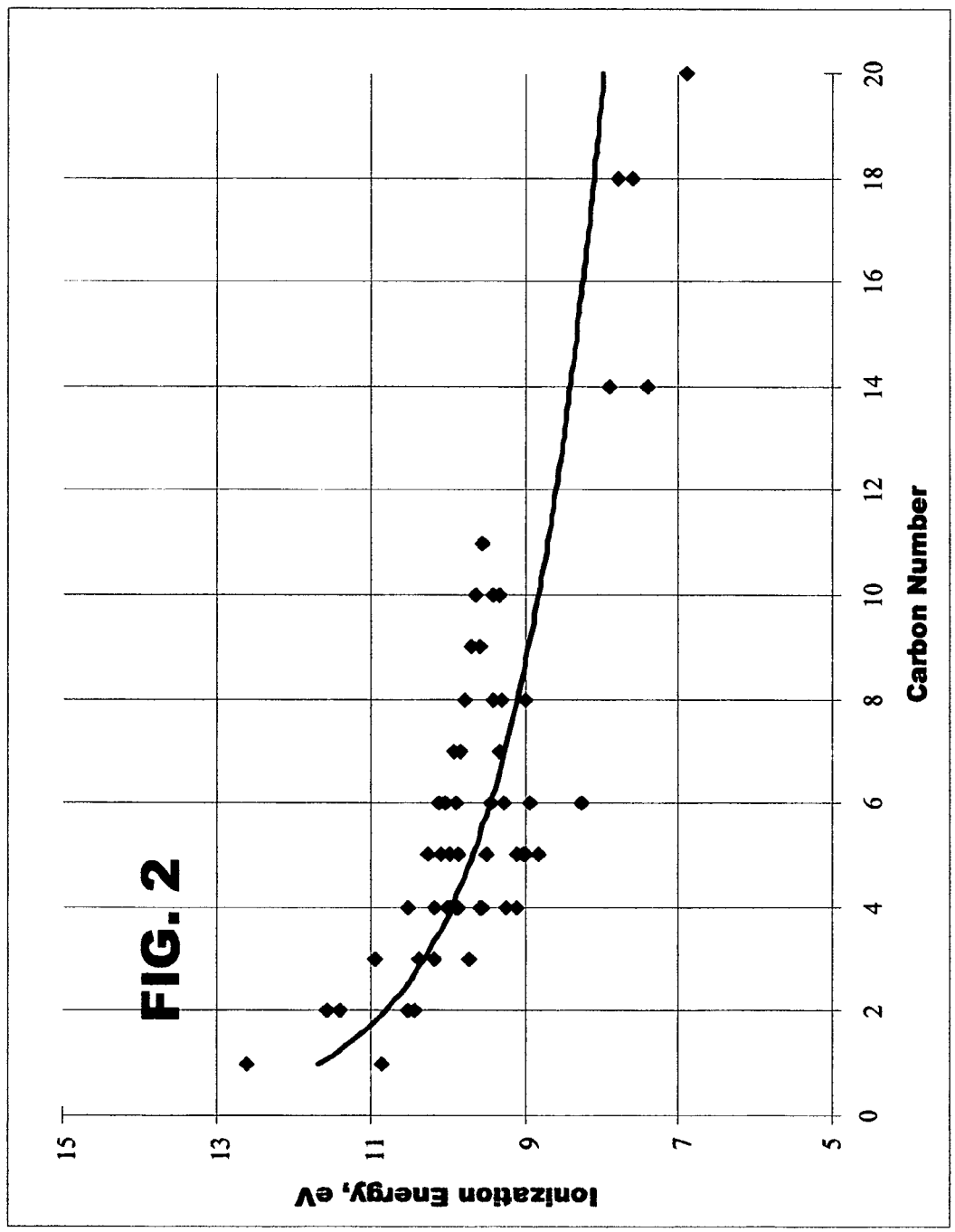
FIG. 2 is a graph of ionization potential of various hydrocarbons as a function of carbon number

$H_2O$ has a high ionization potential (12.6 eV)[[21]] and is a small molecule that presents a small target for hard electrons. Hydrocarbons are larger molecules and those that have a lower ionization potential than water are more readily ionized by hard electrons. FIG. 2 shows that the ionization potential of hydrocarbon decreases as the number of carbon atoms in the molecule, the carbon number, increases (Lias, Sharon G., *Ionization Energies of Gas Phase Molecules, CRC Handbook Chemistry and Physics*, 83rd Ed., pages 10–181 to 10–198)[3]. Ionization originates with ionization of hydrocarbons near the surface of the emitter electrodes 10. These red-hot electrodes also originate an electricity-conducting gas medium that propagates from the emitter electrodes to the collector electrodes 20. The hydrocarbon fuel in addition to being dissociated itself, by being initially ionized initiates plasma conditions that have a field of soft electrons. The soft electrons thus produced readily interact with and are absorbed by the superheated $H_2O$ steam molecules that are energetic at the high temperatures in the reaction chamber. Soft electrons with energies about 5 eV to 6 eV are optimum for dissociating $H_2O$, into hydrogen and oxygen through electron impaction or absorption. Hard electrons with energy above 7 eV and ions play key roles in dissociating and ionizing hydrocarbon fuels. For hydrogen production, the preferred temperature range in the chamber is 700° C. to 1000° C., although the temperature could range from 400° C. upwards to 1900° C. As shown in Eq. 2, steam interacts with soft electrons to form ionized $H_2O$, or hydro-radicals, which dissociates into hydrogen and oxygen. The oxygen thus produced reacts with carbon from dissociation of the hydrocarbon fuel to form carbon oxides, $CO_x$, instead of forming carbon or coke.

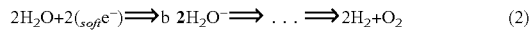

$$2H_2O + 2(_{soft}e^-) \Longrightarrow b\ 2H_2O^- \Longrightarrow \ldots \Longrightarrow 2H_2 + O_2 \quad (2)$$

Figure 3:
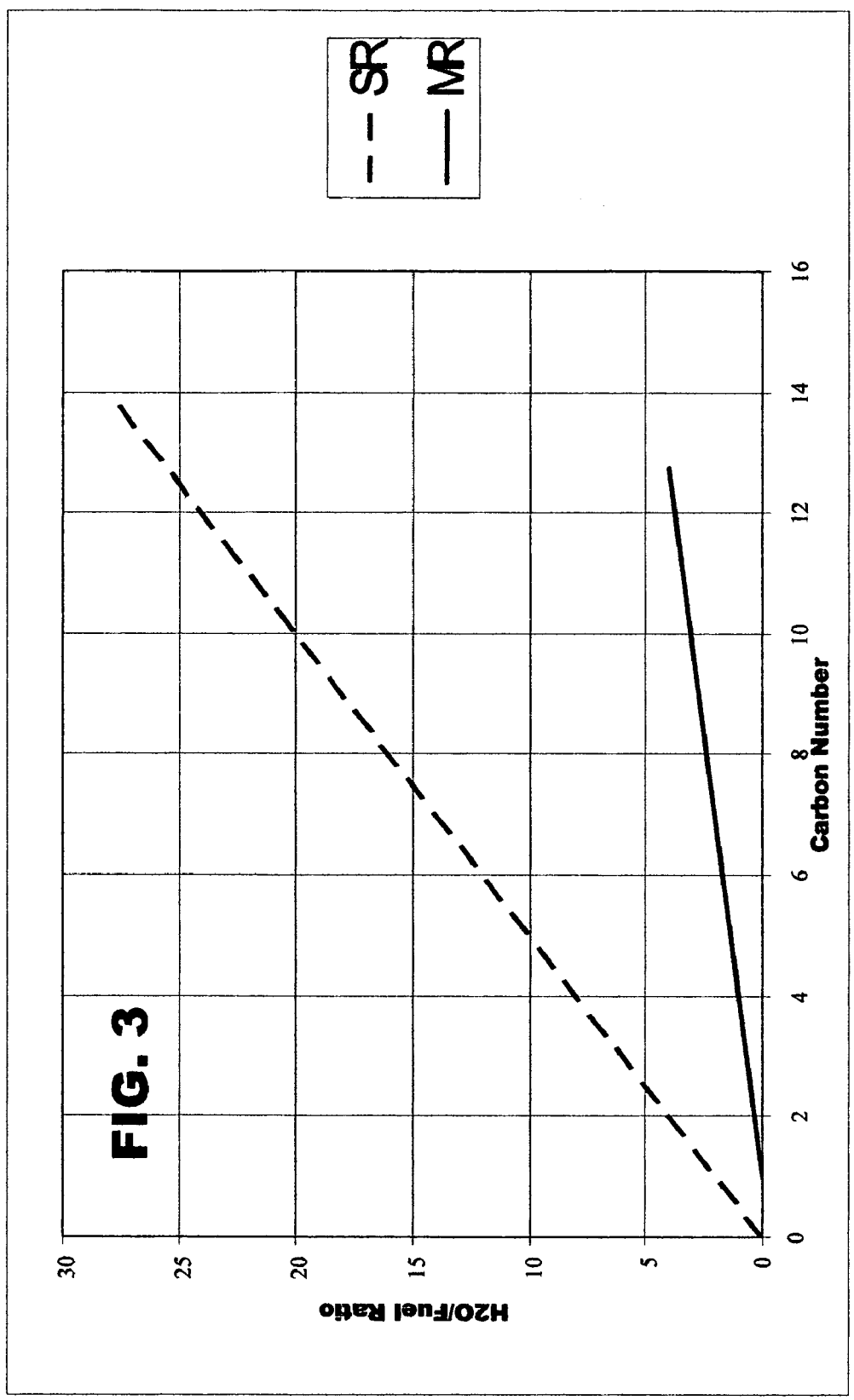
FIG. 3 is a graph of molar water to hydrocarbon fuel ratio as a function of carbon number.

FIG. 3 plots the molar ratio of $H_2O$ to hydrocarbon fuel to obtain reactions as a function of carbon number. The figure shows that the $H_2O$/fuel ratio is a linear function of carbon number. The greater the carbon number of the hydrocarbon fuel, the greater is the percentage of hydrogen that is produced from dissociation of $H_2O$. The solid line (MR) was obtained from preliminary demonstration tests performed by the inventor in which the ratio of $H_2O$/fuel was arbitrarily limited. The dotted line (SR) represents the theoretical stoichiometric ratio, the ratio for which all the oxygen from the dissociated $H_2O$ reacts with all the carbon from the dissociated hydrocarbon fuel to form carbon dioxide. With careful selection of electrode material, and optimized reaction chamber design and operational conditions, the value of $H_2O$/fuel molar ratio can approach and possibly slightly exceed the stochiometric ratio. This means that the majority of hydrogen produced by this reformer can be produced from $H_2O$, with hydrocarbon fuel acting as only an initiator, agent, or promoter.

There are no chemical catalysts, such as nickel or platinum in the reaction chamber. However, the chamber internals (walls, electrodes, filter, and other solid structures) are activated by active, highly energetic electrons and ions so they will act as catalysts. Therefore, the temperature range where plasma reactions occur is lowered to 700° C. to 1,000° C.

For the plasma reformer to perform well, the emitter electrodes should be made of a suitable emitter material. Emitter electrodes should be capable of (1) supplying heat to maintain high temperatures in the reaction chamber of the plasma reformer; and (2) emitting electrons from their surfaces. The properties of good emitter materials are: (1) a high electron emission capability; (2) low rate of deterioration; (3) low emissivity to reduce thermal radiation of the emitters; and (4) no reactions with the hydrocarbon fuel and the surrounding walls, including the filter and collector electrodes. Materials that have these properties include chromium, niobium, tungsten, titanium, zirconium, molybdenum, and other transition metals of the Periodic Table. The collector electrode material should have a low work function. The lower the work function, the less energy electrons give up entering the collector surface. Preferred emitter and collector materials are tungsten, zirconium, titanium, molybdenum, or alloys thereof. The number, shape, and orientation of electrodes are also important. It is preferred that emitter electrode surfaces have needle-type extrusions (with a diameter from 1–2 nanometers to 100 micrometers) to enhance electron emission. Such needle-type extrusions can be grown with special design and treatment, such as acidic etching and chemical vapor deposition. A high electron emission rate will result in a high population of electrons in the reaction chamber and will increase the probability of ionization of the hydrocarbon fuel and dissociation of $H_2O$.

To maintain the high temperature range that is required in reaction chamber 45, the plasma reformer should surround it with layers of insulation. A preferred embodiment, as shown in FIG. 1 should have the following structure. Proceeding from the outside of the reformer inward there is steel casing 31, compression-expansion cushion mat 40, insulating high-temperature fiber blankets 30, high temperature vacuum form fibers 29, a ceramic outer wall 28, an energy retaining zone 27, a ceramic inner wall 26, and turbulent heating zone 35 and reaction chamber 45. The emitter electrodes 10 are on the inner surface of the inner wall. Vacuum form fibers are formed with higher density and a higher percentage of higher melting/boiling point ceramic materials than fiber blankets.

The high-temperature fiber blankets 30 and vacuum form fibers 29 are typically ceramic fibers, which may be composed of commercially-available alumina, silica, or mullite. These materials have very low thermal conductivities (of the order of 0.04 watts/meter-° C.) and are capable of withstanding high temperature (up to at least 1900° C.). The compression-expansion cushion mat 40 provides thermal expansion cushion as well as cushioning for vibration and shocks, seals the contact between the reformer's outer steel casing 31 and the internals including the insulators 29 and 30 and the ceramic outer wall 28, provides thermal insulation, and maintains the system durability throughout the life cycle of the reformer. The compression-expansion mat 40 is made of a low thermal conductivity material that has a great capability for absorbing thermal compression-expansion, shocks, and vibrations, and having the capability of sealing and protecting reformer internals. A commercially available mat product consisting of three basic raw material (ceramic fibers, unexpanded vermiculite, and organic binder) is an appropriate material for the compression-expansion mat. The ceramic walls 26 and 28 may be zirconium oxide, silicon carbide or graphite. The energy retaining zone 27 and turbulent heating zone 35 contain layers of heat-retaining micro-porous articulated ceramic fibers, such as alumina, silica, mullite, titanate, spinel, zirconia, or some combination thereof. The physical properties of these ceramic fibers (such as thermal emissivity, absorptivity, reflectivity, conductivity, porosity) have some impact on energy efficiency and may increase or decrease energy efficiency by as much as approximately 10 percent. The choice of ceramic fibers can be optimized for specific feed streams by considering the conductive, convective, and radiative heat transfer in a porous medium reactive flow for different types of ceramic fibers.

A gaseous or vaporized feed stream enters the reactor chamber by means of inlet 33 that penetrate the bottom of the reactor's steel casing 31, compression-expansion cushion mat 40, insulating high-temperature fiber blankets 30, high-temperature vacuum form fibers 29, and ceramic inner wall 26. The feed stream enters the turbulent heating zone 35 where it is subject to turbulent mixing and is rapidly heated by conduction, convection, and radiation. Within the reaction chamber 45, the gaseous $H_2O$ and hydrocarbon fuel stream is heated further by radiation to temperatures sufficient to reform the chemical bonds of the hydrocarbon fuel, and the $H_2O$ and hydrocarbon fuel are dissociated through ionization as described previously.

After leaving the reaction chamber, the reformate stream passes through the energy retaining zone 27, where further thermal reforming continues to occur, and exits the reactor through outlet 32. Reforming in the energy retaining zone helps to complete the reforming of the chemical compounds in the feed stream. Electrons or ions that escape from the reaction zone and flow downstream are also neutralized by direct impact within high-contact areas and micro-porous structure in the heat-retaining zone. The unique design of the energy-retaining zone (downstream of the reaction chamber) and the turbulent-heating zone underneath (or upstream of) the reaction chamber is attributable to the use of micro-porous structure technology. The advantages of this micro-porous structure design include (1) the creation of a rapid mixing and heating environment; (2) the promotion of excellent heat and mass transfer; (3) the creation of thermal uniformity for reforming uniform products; (4) the trapping of most heat energy within the turbulent-heating and energy-retaining zones; and (5) the maintaining of extremely high temperature in the reaction chamber. These advantages significantly reduce the cold-start and transient response times from transient load change of the feed stream. There are two sources of energy in the plasma reformer, electrical energy and chemical energy from the input fuel. The electrical energy initiates ionization that leads to release of the chemical energy. The electrical energy, which controls maintaining optimal plasma conditions at a pre-set temperature, serves as a supplement to the chemical energy released. The electrical energy is nearly independent of the amount of chemical energy released but is much smaller than the amount of chemical energy. This electrical ionization (or plasma) amplified with large chemical energy release from the fuel initiates the gas-phase electrolysis, or plasma-induced steam reforming that produces additional hydrogen from the water.

Inlet 33 and outlet 32 preferably have double walls tubes to prevent leaks. These double-walled tubes have an inner wall of a ceramic material that can withstand high temperatures and contact with a potentially corrosive feed, or product stream, and an outer wall of stainless steel that can withstand high temperatures.

What is claimed is:

1. A plasma reformer for dissociating water and hydrocarbon fuel in a preheated gaseous form comprising:
    a turbulent heating zone containing micro-porous articulated material with a first impervious ceramic wall laterally bounding it;
    a reaction chamber downstream from the turbulent heating zone, the reaction chamber having emitter electrode means attached to the first impervious ceramic wall laterally bounding it, an inner lateral wall containing collector electrode means, and an electric circuit maintained between the emitter electrode means and the collector electrode means;
    an energy retaining zone containing micro-porous articulated material arrayed downstream from the reaction chamber;
    low thermal conductivity materials surrounding the energy retaining zone;
    compression-expansion cushion mat material surrounding the low thermal conductivity material;
    an ion-neutralization filter surrounding the collector electrode means in the reaction chamber;
    a casing; and
    Ingress means into the turbulent heating zone and egress means from the energy retaining zone.

2. A plasma reformer as set forth in claim 1 wherein the reaction chamber is maintained in a temperature range of 400° C. to 1900° C.

3. A plasma reformer as set forth in claim 2 wherein the emitter electrode means have a multiplicity of thin needle-like extrusions.

4. A plasma reformer as set forth in claim 3 wherein the needle-like extrusions have diameters between 1 nanometer and 100 micrometers.

5. A plasma reformer as set forth in claim 4 wherein the emitter and collector electrode means are a metal selected from the group consisting of tungsten, zirconium, titanium, molybdenum, and alloys thereof.

6. A plasma reformer as set forth in claim 5 further comprising a second ceramic wall laterally surrounding the energy retaining zone and inside of the low thermal conductivity material.

7. A plasma reformer as set forth in claim 6 wherein the material in the turbulent heating zone and the energy retaining zone have micro-porous structure layers selected from the group consisting of alumina, silica, mullite, titanate, spinel, zirconia, or some combination thereof.

8. A plasma reformer as set forth in claim 7 wherein the low conductivity materials are vacuum form fibers arrayed interior to fiber blankets, the vacuum form fibers having a greater density and a higher percentage of higher melting point material than the fiber blankets.

9. A plasma reformer as set forth in claim 8 wherein the compression-expansion cushion mat material is low thermal conductive material.

10. A plasma reformer as set forth in claim 1 wherein the ion-neutralization filter material is a semiconductor.

11. A plasma reformer as set forth in claim 1 wherein the ion-neutralization filter material is a ceramic alloy.

12. A plasma reformer as set forth in claim 1 wherein each electric circuit is connected to a different electricity source.

13. A plasma reformer as set forth in claim 1 wherein the ingress means into the turbulent heating zone and the egress means from the energy retaining zone are double-walled tubes have an inner wall of a ceramic material and an outer wall of stainless steel.

* * * * *